US005603033A

United States Patent [19]
Joannin

[11] Patent Number: 5,603,033
[45] Date of Patent: Feb. 11, 1997

[54] TOOL FOR DEBUGGING AN OPERATING SYSTEM

[75] Inventor: Jean-Pierre Joannin, Eybens, France

[73] Assignee: Bull, S.A., Paris, France

[21] Appl. No.: 228,429

[22] Filed: Apr. 15, 1994

[30] Foreign Application Priority Data

Apr. 22, 1993 [FR] France .................................. 93 04774

[51] Int. Cl.⁶ ..................................................... G06F 11/00
[52] U.S. Cl. ...................... 395/704; 364/280; 364/280.2; 364/280.3; 364/280.9; 364/267.91; 364/275.5; 364/DIG. 1; 364/975.2; 364/975.4; 364/976; 364/978.2; 364/DIG. 2
[58] Field of Search .......................... 395/700; 364/280, 364/280.2, 280.3, 280.9, 267.91, 275.5, 975.2, 975.4, 976, 978.2

[56] References Cited

U.S. PATENT DOCUMENTS

| | | | |
|---|---|---|---|
| 4,462,077 | 7/1984 | Yonk | 364/300 |
| 4,819,234 | 4/1989 | Huber | 371/19 |
| 4,835,685 | 5/1989 | Kun | 364/200 |
| 5,063,499 | 11/1991 | Garber | 395/500 |
| 5,093,914 | 3/1992 | Coplien et al. | 395/700 |
| 5,127,103 | 6/1992 | Hill et al. | 395/575 |
| 5,355,487 | 10/1994 | Keller et al. | 395/650 |

OTHER PUBLICATIONS

Moher, T., "Provide: A Process Visualization and Debugging Environment", IEEE Transactions On Software Engineering, vol. 14, No. 6, Jun. 1988.

IBM Technical Disclosure Bulletin, vol. 34, No. 1, pp. 451–452, Jun. 1991, New York, US, "Resetting Dirty Bits on OS/2 2.0".

*Primary Examiner*—Kevin A. Kriess
*Assistant Examiner*—Michael T. Richey
*Attorney, Agent, or Firm*—Kerkam, Stowell, Kondracki and Clarke, P.C.; Edward J. Kondracki

[57] ABSTRACT

A tool (KD) for debugging an operating system, which among other elements includes at least one processor (P), a memory (M) for use by the processor, and a memory management unit (MMU). The tool is stored in a zone of the memory (M) where the virtual addressing mode is equal to the physical addressing mode. The tool is operable to perform by a predetermined method, and the tool executes each operation in the physical addressing mode, independently of the management unit (MMU). For controlling the phases of initialization of the machine, the tool supports at least two exception vectors (BP, DSI), and among other elements includes its own stack (S), a decoder (DEC) which uses an algorithm that is operational regardless of the context of the process analyzed and regardless of the storage means (CMM) of the decoded context.

20 Claims, 1 Drawing Sheet

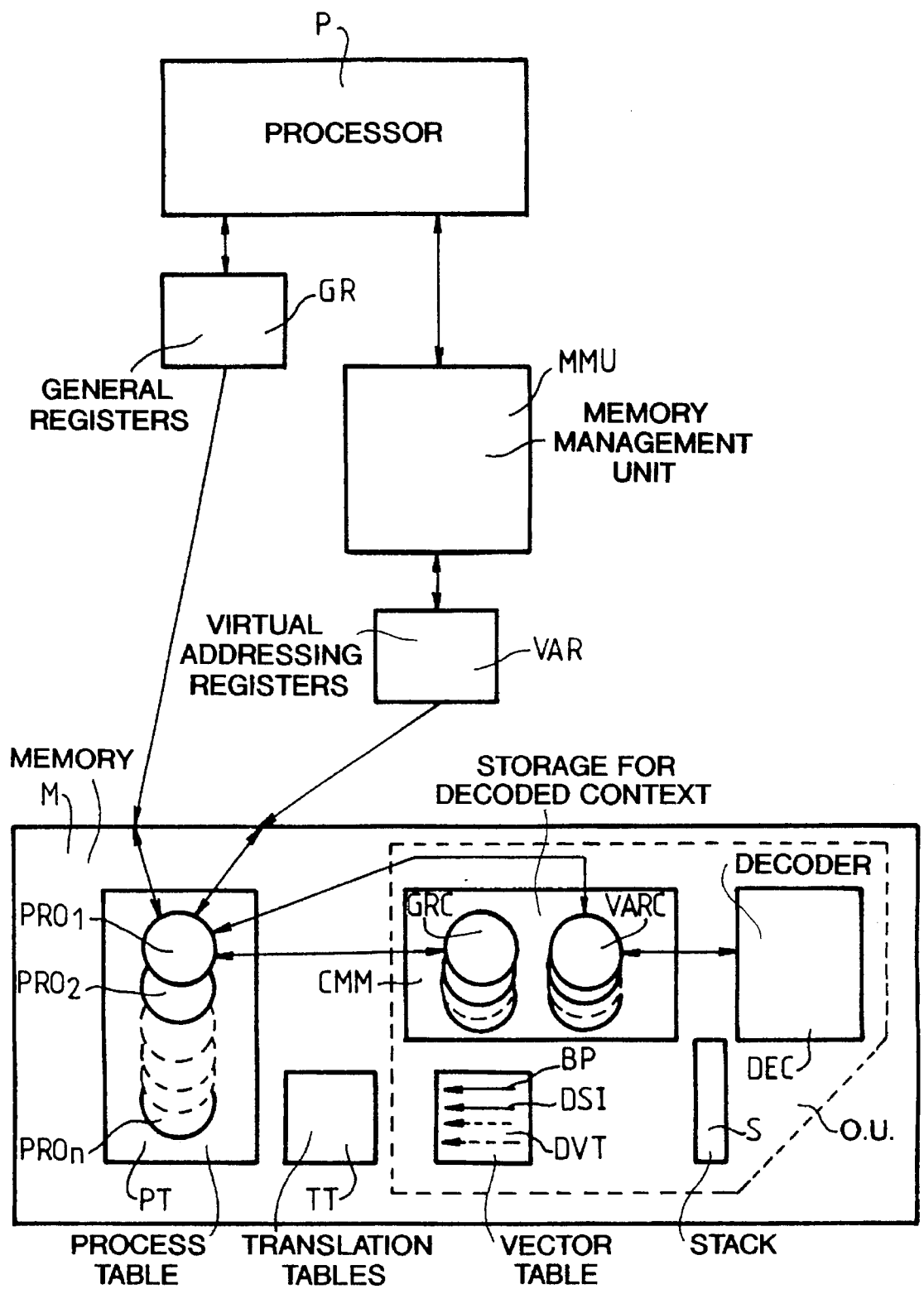

TOOL FOR DEBUGGING AN OPERATING SYSTEM

FIELD OF THE INVENTION

The present invention relates to a tool for debugging an operating system of a machine that among other elements includes at least one processor, a memory for use by the processor, and a memory management unit.

BACKGROUND OF THE INVENTION

When a system, whether a monoprocessor or a multiprocessor, is booted, the core or operating system typically functions in a physical addressing mode, also called the real mode, as long as the memory management unit thereof is not initialized. As soon as the memory management unit is initialized, the core of operating system operates in a virtual addressing mode, and only then can a debugging tool, which generally functions in the virtual mode, become operational. This has a certain number of disadvantages. The initializing phases cannot in fact be debugged until after initialization of the memory management unit, since the debugging tool or "debugger" that uses the virtual addresses is dependent on the memory management unit, which translates the physical addresses into virtual addresses. Accordingly, an error occurring during the initialization phases can be difficult to detect; and result in the system remaining blocked. Similarly, because the debugging tool depends on the memory management unit, a change from the current context to some other desired context cannot be authorized in a simple manner, since only one context is valid at a given moment through the memory management unit. Finally, when a failure in virtual memory occurs, either during the initialization phases, when the debugging tool is not yet active, or later when the virtual memory is initialized, this tool can be perturbed considerably, since it uses the same virtual memory; moreover, under these conditions, it cannot be used to analyze such failures.

OBJECT OF THE INVENTION

The object of present invention is to overcome the various disadvantages presented by the debugging tool of the prior art and to propose an effective tool that is easy to use and moreover can be employed completely autonomously.

To achieve this, the tool for debugging an operating system of a machine, of the type referred to at the outset, is notable in that during the entire debugging performed by a predetermined method, it performs each operation in the physical mode, working in a zone of the memory where the virtual addressing mode is equal to the physical addressing mode, and independently of the memory management unit, said tool, for controlling the phases of initializing the machine, supporting at least two exception vectors and including, among other elements, its own stack that it initializes, and a decoder using an algorithm that is usable regardless of the context of the process analyzed and regardless of the means for storage of the decoded context.

Thus, one of the key features of the invention consists of designing an independent tool which does not use the memory management unit of the processor to access the virtual addresses. A second major features of the invention resides in the fact that each operation of the tool is done in the physical mode, with the tool working in the zone of a memory where the virtual mode is equal to the physical mode and including a decoder that enables it to work in a non-translated mode, since when decoding is necessary, the translation or conversion from the virtual mode to the physical mode is done directly by this decoder. For each memory access, the decoder uses an algorithm that simulates the virtual memory, and that can be used regardless of the chosen processing context. In fact, the tool always runs in the physical mode, and as soon as the memory management unit is initialized, it executes the translation itself in order to retrieve the physical addresses from the virtual addresses, with its decoder then simulating the algorithm ordinarily used by the memory management unit. The use of the present debugging tool which operates independently of the memory management unit has a great number of advantages, the first of which is to enable debugging of all the phases, including initializing phases. In particular, both the operating system and the memory management unit can be started up under the control of the debugging tool, which can furthermore act completely autonomously, in a mode that one skilled in the art customarily calls "stand-alone". In this "stand-alone" mode, it is then possible to debug autonomous programs or codes for starting up the operating system.

Notably, the debugging tool enables the selection of any context of one of the processes contained in a process table written in the memory, where the process table contains the address of the context to be selected, and this virtual address is being decoded to retrieve this context, and the latter context is then substituted for the current context by recopying in the storage means after reinitialization of the stack.

Hence all the virtual space of the system is made visible; unlike known debugging tools, which provide the same visibility of the operating system where only the processing of the ongoing process is seen in the virtual mode by way of its virtual context. In accordance with the present invention, the tool is capable of shifting from the current context to any other context chosen, by taking the corresponding virtual context and applying a translation from the virtual mode to the physical mode. The present tool has debugging characteristics and enables an analysis of data of any context relating to any process. The present tool can work independently of the contexts, since it assures the translation from the virtual mode itself to the physical mode.

The fundamental difference between the memory management unit and the decoder quite evidently relates to the performance thereof. Thus, one may have a prejudice against using this type of debugging tool. However, in the present invention, since the debugging tool is in complete control of the processor resource when it is active, the problem of response time or performance does not arise.

Furthermore, the debugging tool according to the invention can advantageously be used for analyzing the memory image that one skilled in the art calls a "dump". In fact, any memory image of the physical mode may be obtained by way of a post-mortem dump or by way of a physical memory driver, and so this memory image, or dump, can be explored using the debugging tool in the user mode. The fact that the tool can itself make a translation from the virtual mode to the physical mode allows the tool to access any virtual address of the system in the user mode. Hence, the tool, when running in the user mode, also makes it possible to analyze the current system or the result of a memory dump after an error. In the prior art, this type of analysis was necessarily done using a specific analysis tool independent of the debugging tool.

Another advantage of the present invention is that, since it uses its own stack and its own exception vectors, it is immunized to the failures of the system stack.

As noted above, the debugging is done by a predetermined method. In this method, in a notable fashion, in a first step, the tool, recognizing a call provoked by an exception, selects and initializes its own stack for working in the physical mode; in a second step of taking control, it receives the parameters of the context to be processed and uses the translation algorithm in order for each access to simulate the virtual memory by means of the decoder that translates the virtual address to the physical address, the context parameters thus decoded being transferred to the context storage means; and then in a third step, it initializes the console, so that an operator is thus authorized to act; while in a final step, once the debugging is done, it yields control to the machine. Such a method makes it possible to perform debugging easily, independently and effectively during all the operating phases of the machine and for any context.

BRIEF DESCRIPTION OF THE DRAWING

The following description in conjunction with the appended drawing, all of which is given by way of non-limiting example, will enable better comprehension of how the present inventors and the invention can be achieved.

FIG. 1 is a block diagram which illustrates the environment in which the debugging tool of the present invention is integrated and developed.

DETAILED DESCRIPTION OF THE PREFERRED EMBODIMENTS

FIG. 1 shows schematically, and in an intentionally simplified form, the portion of an operating system constituting the environment required for using and understanding the present debugging tool for operating system, and in particular the processor P, the memory M and the memory management unit MMU. Associated with the processor P, are the general registers GR which contain, among other elements, the various contexts of the system attached to the various processes PRO1, PRO2, . . . , PROn, which themselves are contained in the process table PT embedded in the memory M. Also associated with the memory management unit MMU are the virtual addressing registers VAR containing the virtual addresses of the various contexts attached to the various processes in the process table PT.

The debugging tool KD, in its entirety, is embedded and locked in the memory M in a notable manner, in a zone where the virtual addressing mode is equal to the physical addressing mode, which accordingly is a non-paginatable zone, and hence is independent of the memory management unit MMU. In general, there will always be some portion of the operating system that is necessarily embedded in a zone of the memory where the virtual addressing mode is equal to the physical addressing mode. Moreover, it is normal for all the exception vectors as well as all the processing operations close to the processor to be embedded in this same type of zone, so that it is possible to work in the two modes. The tool KD of the present invention belongs to this category. The tool KD advantageously includes its own stack S, a decoder DEC, and means CMM for storing the decoded context. The tool KD furthermore has a vector table DVT, which includes at least two exception vectors BP and DSI, which allow effective functioning during the phases of initialization, as will be explained hereinafter.

Upon startup, according to the invention, the tool KD is intended to start in the non-translated mode (that is, the physical mode), and it must also stay in this non-translated mode even when the virtual memory is initialized. For that purpose, when the tool is called up so as to control the initializing phases and the proper operation of the operating system, the two bits of the state mode of the processor P are invalidated, in order to force working in the physical mode. These two bits of the processor P to be invalidated are, in a known manner, the bit validating the translation for the instruction code and the validation bit for translation of the data, and they are generally manipulated at the same time. Moreover, because work is done in the non-translated mode, it is possible, as has been noted above, to be independent of the context of the system, since the translation is done by the decoder of the tool KD itself. Hence, when the current context is analyzed, the decoder uses an algorithm that is intended to simulate the virtual memory. This algorithm is usable regardless of the context, which enables changing the context easily when desired. Furthermore, advantageously, when the tool KD is invoked to take control, for example because a failure has occurred in the virtual memory, the tool KD is always active and is not effected by this failure of the system, since it does not use the virtual memory. This is important both upon startup and over the life of the system, because as soon as a failure of the virtual memory is detected, this memory can be analyzed, since the tool KD is working in the physical mode, or the non-translated mode. The algorithm that enables the decoder DEC to perform the decoding of the virtual addresses is in fact the same as the decoding algorithm of the microprocessor in use (distributed by the manufacturers), that describes the function of the virtual memory, and so it suffices to translate it in code. Thus, in the decoder DEC, the tool KD has its own translator, which plays the role of the memory management unit but without having its disadvantages.

Besides the addresses specific to the operating system, the user addresses of any user process that is running under the operating system are also decoded by the same technique, since the decoding algorithms are the same. An enormous advantage thus arises because visibility of any user space is obtained in an easy manner. In fact, the various user processes belong to different virtual spaces, whose addresses can be decoded in the same way.

The process running at a given moment uses all the registers GR and VAR respectively associated with the processor P and the memory management unit MMU of the machine, which contain the context of operation of this process contained in this process table PT. The tool uses the registers GRC and VARC associated with this process in order to retrieve the past context, in the form of parameters. These registers GRC and VARC are contained in the context storage means CMM and at a given moment represent the contents of the registers GR and VAR, with the decoder DEC simulating the translation function of the memory management unit MMU in order to decode the addresses of the context enabling access to the memory M. In memory, there are also translation tables TT, which enable decoding of an address. In the same way as the unit MMU, the decoder DEC uses these tables TT to deduce from them a physical address. For the needs of the tool KD, when an exception occurs, the context contained in the registers GR and VAR is accordingly recopied into the associated registers GRC and VARC in order to back them up, the registers GR and VAR being used to process the exception. In this backed-up manner, the context can then, once the processing of the exception is completed, be restored and the method can restart at the point where it was interrupted. The backed-up context parameters make it possible to know the place where the process was interrupted by the exception. The backed-up context also includes the indication of the command register (known to one skilled in the art as a "program counter") relating to the address of the exception vector that has been generated.

In more detail, and in accordance with a predetermined method, the tool KD, when it is invoked by an exception, must, in order to run its code, use its registers GRC and VARC as well as its internal stack S, which for that purpose must be initialized. Once the stack S is initialized, the tool KD, by its design (being embedded in a zone of the memory where the virtual addressing mode is equal to the physical addressing mode), executes its code in the physical mode. It then receives the parameters of the context of the process to be analyzed in its registers GRC and VARC, specifically, the past address in the form of parameters first in its register VARC, making it possible to know where the context is located. The context contains all the information that will enable decoding of the virtual addresses of the current process. The addresses are decoded by the decoder DEC, which enables retrieval of the context in memory and recopying of the context to the register GRC, to which the tool KD has direct access for its analysis. This explains the advantage that the tool KD attains when it is desired to change context for some other process, since it suffices in fact to decode the address of this new context and then recopy it to the register GRC. Hence, access to any context is easily achieved, independently of the memory management unit MMU, simply by decoding the address of the desired analyzed context.

Similarly, to shift from one system to another, all that has to be done is to rewrite one function for each system: the function described by the algorithm for decoding from the virtual mode to the physical mode. In fact, these various systems are compatible with one another at the level of their architecture, and only the processor changes, which means that all that is necessary is to change the decoding technique and hence the decoding algorithm as a function of the new processor.

The tool KD can be initialized, for example in the startup process (that is, the "booting" phase), which makes it completely independent and makes it active very quickly, as early as the initialization phases of the system, even before the system is actually booted up, with the booting phase done under the control of the tool KD.

The tool KD preferably has its own exception vectors contained at fixed addresses in its exception vector table DVT. Hence, at least two vectors BP and DSI are used for booting the system directly by the tool KD, independently of the operating system. The first vector BP is associated with all the stop points; thus the tool KD can immediately use stop points for an analysis that is desired to be performed. The second vector DSI is the vector that is called up each time an invalid address is found in the system, even during the phases of initializing the system. Furthermore, the tool KD can use other vectors, and in particular, when the processor allows this, the exception vector, thus enabling the performance of step by step analyses ("stepping"), where the processor P stops automatically at each instruction by generating an exception at each step. This last exception vector can prove particularly useful and advantageous when the system includes a multiprocessor, since it enables the processor P in question to perform a step by step analysis without in any way disturbing any of the other processors.

The debugging principle consists in general of placing stop points in a process. To do so, an instruction is written, which will provoke an exception instead of the instruction that is actually supposed to be executed. When the program is executed, at the moment of the shift to this instruction, the exception is generated; the processor then jumps to a predefined address which enables processing of the exception. In all cases, all the exceptions are invoked at the level of the processor in the physical mode. In the present case, in order for it to be processed, the exception must be recognized as being of the type corresponding to debugging of an operating system. The tool knows that it is invoked when such an exception is encountered, and it can then receive the parameters of the exception context and retrieve this context to analyze it. Upon the transmission of a message that says a stop point has been encountered at a given address, the operator has the capability of acting; he can visualize memory zones, continue the step by step analysis from this address, place other stop points at other addresses in order to stop at those addresses, or turn control back over to the system. When he turns over control to the system, the context that he has analyzed is restored by the machine, which resumes its execution at the place where the interruption occurred.

Also in a notable fashion, in the course of the initialization of the tool KD, the console interface is initialized, to allow an operator to intervene from that moment on. Still within the initialization phase of the tool KD and just after the initialization of the console, when the system is first initialized, provision may be made in the code of the tool KD for a static stop point in the system, which generates an exception enabling the operator to intervene during the first debugging of the system after the issuance of a message and to control the standard initialization of the system. The operator can then place stop points at predefined addresses, optionally proceeding step by step in the program.

In an external environment such as UNIX (trademark registered by UNIX System Laboratories Inc.), one way to make the tool KD still more independent and autonomous consists in having the tool, in a first period of time, take control of its exception vectors, and then furnish these vectors to the external environment, such as UNIX. In fact, the vectors are then directly associated with this external environment, and the tool KD can be called to debug autonomous programs or system startup codes, completely independently of the operating system.

Finally and advantageously, the debugging tool according to the invention can be effectively used for analysis of the memory image (known as "post-mortem dump"). In fact, since the tool KD can scrutinize the memory in the physical mode, its use can be extended to a post-mortem dump application. When a post-mortem dump is performed, the same algorithm is still applicable, since such an analysis is necessarily done in the physical mode. To do so, the dump is retrieved from a disk or a file, as is typically done, and then in an original manner, the algorithm employed by the tool KD is applied to the contents of this disk or file, thus making it possible to analyze a given problem that occurs when a system malfunctions. In such an application, the retrieved dump can be analyzed directly on a standard system by way of the tool KD, similar to a dump analyzer, which simulates the virtual memory (the information retrieved necessarily has virtual addresses) and uses the same algorithm without further expansion. Because of the original design of the tool KD as detailed above, it is possible to use merely a single expansion and hence a single tool, where ordinarily two independent tools are necessary.

In conclusion, using the debugging tool designed according to the present invention has numerous advantages. One of the main advantages is that it enables veritable autonomy, since the tool performs every operation in the physical mode, completely independently of the memory management unit, while preserving very powerful performance. Furthermore, debugging of the operating system can be done as easily as the system initializing phases. Moreover, all the virtual space of this system is made visible, with the tool itself performing each translation from the virtual mode to the physical mode and hence allowing an easy change of any context.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

I claim:

1. A tool for debugging an operating system of an information processing machine, wherein the machine includes at least one processor, a memory for use by the processor, and a memory management unit, comprising means for performing debugging of a process having a given context in accordance with a predetermined method, means for enabling each operation of said debugging to be performed in a physical addressing mode, while working in a zone of the memory where a virtual addressing mode is equal to the physical addressing mode, wherein said tool operates independently of the memory management unit, and further including means for controlling operational phases necessary for initializing the machine, means for supporting at least two exception vectors, a stack capable of being initialized by said tool, a decoder for decoding said given context which uses an algorithm for generating a decoded context, and context storage means for storing said decoded context, said algorithm being operational regardless of the given context of the process being debugged and regardless of the type of context storage means used for storage of said decoded context.

2. The debugging tool of claim 1, wherein said means for performing debugging includes means for recognizing a call to said tool in response to an exception, means for selecting and initializing said stack for working in the physical addressing mode, means for receiving parameters of the context to be processed and for decoding the context by using the algorithm of said decoder to translate virtual addresses to physical addresses, means for transferring the decoded context to the context storage means, means for initializing a console of the machine so that a user can provide input thereto, and means for returning control to the machine once the debugging is complete.

3. The debugging tool of claim 1, further including means for enabling selection of a context of a process contained in a process table stored in the memory, wherein the process table contains a virtual address of the context selected, said decoder being operable to decode the virtual address and to retrieve a corresponding context, and further including means for substituting said corresponding context for a current context by copying said corresponding context in the context storage means after reinitialization of the stack.

4. The debugging tool of claim 1, wherein the decoding algorithm used by the decoder is an algorithm for decoding the processor of said machine.

5. The debugging tool of claim 1, further including a table of exception vectors containing at least two exception vectors at fixed addresses, said at least two exception vectors including a first exception vector for enabling placement of stop points at predetermined points in said process to allow an analysis to begin at a predetermined instruction of said process, and a second exception vector for calling when an invalid address is requested during said process.

6. The debugging tool of claim 5, wherein said machine includes a plurality of processors, said table of exception vectors further including a third exception vector which enables a step-by-step analysis of said process to be performed by one of said plurality of processors without disturbing the other processors.

7. The debugging tool of claim 5, further including means for providing a static stop point in the initialization of the machine and generating an exception that enables an operator to intervene after issuance of a message for controlling initialization of the machine, said stop point being provided just after initialization of a console of the machine.

8. The debugging tool of claim 6, further including means for providing a static stop point in the initialization of the machine and generating an exception that enables an operator to intervene after issuance of a message for controlling initialization of the machine, said stop point being provided just after initialization of a console of the machine.

9. The debugging tool of claim 1, wherein the machine is part of an external environment and further including means for taking control of the exception vectors and furnishing the exception vectors to the external environment, the exception vectors being associated directly with the external environment, and means for enabling the debugging tool to be called in order to perform a desired debugging operation in a completely autonomous manner.

10. The debugging tool of claim 2, wherein the machine is part of an external environment and further including means for taking control of the exception vectors and furnishing the exception vectors to the external environment, the exception vectors being associated directly with the external environment, and means for enabling the debugging tool to be called in order to perform a desired debugging operation in a completely autonomous manner.

11. The debugging tool of claim 1, further including means for enabling said tool to be used in a user mode for analyzing a post-mortem dump.

12. The debugging tool of claim 2, further including means for enabling said tool to be used in a user mode for analyzing a post-mortem dump.

13. A method for use in debugging an operating system of an information processing machine, wherein the machine includes at least one processor, a memory for use by the processor, and a memory management unit, the machine including a tool for debugging in the memory, wherein the tool includes means for performing debugging of a process having a given context in accordance with the method, means for enabling each operation of said debugging to be performed in a physical addressing mode while working in a zone of the memory where virtual addressing mode is equal to the physical addressing mode, wherein the tool operates independently of the memory management unit, and further including means for controlling operational phases necessary for initializing the machine, means for supporting at least two exception vectors, a stack capable of being initialized by said tool, a decoder for decoding said given context which uses an algorithm for generating decoded context, and storage means for storing the decoded context, said algorithm being operational regardless of the given context of the process being debugged and regardless of the type of storage means used to store the decoded context, said method comprising the steps of:

recognizing a call to said tool in response to an exception;

selecting and initializing said stack for working in the physical addressing mode;

receiving, by the tool, parameters of the context to be processed and for decoding the context by using the algorithm of the decoder to translate virtual addresses into physical addresses;

transferring the decoded context to the storage means;

initializing a console of the machine so that the user can provide input thereto; and returning control to the machine once the debugging is complete.

14. The method of claim 13, further including the steps of selecting a context of a process contained in a process table stored in the memory, wherein the process table contains a virtual address of the context to be selected, decoding the virtual address and retrieving a corresponding context, and substituting the corresponding context for a current context by copying the corresponding context in the storage means after reinitializing the stack.

15. The method of claim 13, wherein the decoding algorithm is selected to be an algorithm for decoding the processor of the machine.

16. The method of claim 13, further including the step of placing stop points at preselected points in said process to allow an analysis to begin at a predetermined instruction of said process, and calling an exception vector if an invalid address is requested during said process.

17. The method of claim 15, further including the step of providing a static stop point in the initialization of the machine and generating an exception that enables an operator to intervene after issuance of a message for controlling initialization of the machine, said stop point being provided just after initialization of a console of the machine.

18. The method of claim 13, wherein the machine is part of an external environment, and further including the steps of taking control of the exception vectors, furnishing the exception vectors to the external environment, wherein the exception vectors are associated directly with the external environment, and enabling the debugging tool to be called in order to perform a desired debugging operation in a completely autonomous manner.

19. The method of claim 14, wherein the machine is part of an external environment, and further including the steps of taking control of the exception vectors, furnishing the exception vectors to the external environment, wherein the exception vectors are associated directly with the external environment, and enabling the debugging tool to be called in order to perform a desired debugging operation in a completely autonomous manner.

20. The method of claim 13, further including the step of enabling the tool to be used in a user mode for analyzing a post-mortem dump.

\* \* \* \* \*